(12) United States Patent
Inamdar et al.

(10) Patent No.: US 9,959,421 B2
(45) Date of Patent: May 1, 2018

(54) SYSTEM AND METHOD FOR MONITORING AND DIAGNOSTICS IN A MULTITENANT APPLICATION SERVER ENVIRONMENT

(71) Applicant: Oracle International Corporation, Redwood Shores, CA (US)

(72) Inventors: Rajendra Inamdar, N. Chelmsford, MA (US); Anthony Vlatas, Brookline, NH (US); Michael Cico, Hampton, NH (US); Sandeep Shrivastava, Westford, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 171 days.

(21) Appl. No.: 14/747,866

(22) Filed: Jun. 23, 2015

(65) Prior Publication Data

US 2015/0372887 A1  Dec. 24, 2015

Related U.S. Application Data

(60) Provisional application No. 62/016,041, filed on Jun. 23, 2014.

(51) Int. Cl.
*G06F 15/173* (2006.01)
*G06F 21/62* (2013.01)
*H04L 12/26* (2006.01)

(52) U.S. Cl.
CPC ...... *G06F 21/6218* (2013.01); *H04L 43/0817* (2013.01)

(58) Field of Classification Search
None
See application file for complete search history.

(56) References Cited

U.S. PATENT DOCUMENTS

| 9,667,703 B1 * | 5/2017 | Vetter | H04L 67/10 |
| 2005/0283658 A1 * | 12/2005 | Clark | G06F 11/2028 |
| | | | 714/11 |
| 2009/0271696 A1 | 10/2009 | Bailor et al. | |

(Continued)

OTHER PUBLICATIONS

European Patent Office, International Searching Authority, International Search Report and Written Opinion dated Sep. 24, 2015 for International Application No. PCT/US2015/037265, 10 pages.

(Continued)

*Primary Examiner* — Phyllis A Book
(74) *Attorney, Agent, or Firm* — Tucker Ellis LLP

(57) ABSTRACT

A system and method for monitoring and diagnostics in an application server environment. A system can comprise one or more computers, which can include an application server environment executing thereon, together with a plurality of deployable resources configured to be used within the application server environment, and a plurality of partitions, wherein each partition provides an administrative and runtime subdivision of a domain. A diagnostic framework, such as a WebLogic Diagnostic Framework (WLDF) can also be provided, wherein the diagnostic framework is configured to perform at least one action from the group consisting of partition scoped logging, partition scoped monitoring, and partition scoped diagnostic imaging.

17 Claims, 9 Drawing Sheets

(56) References Cited

U.S. PATENT DOCUMENTS

| | | | |
|---|---|---|---|
| 2010/0138696 A1* | 6/2010 | Dehaan | G06F 11/2294 |
| | | | 714/37 |
| 2010/0251002 A1* | 9/2010 | Sivasubramanian | G06F 9/5061 |
| | | | 714/2 |
| 2011/0213870 A1 | 9/2011 | Cai et al. | |
| 2012/0072597 A1 | 3/2012 | Teather et al. | |
| 2012/0096521 A1* | 4/2012 | Peddada | G06F 21/629 |
| | | | 726/4 |
| 2012/0110566 A1 | 5/2012 | Park | |
| 2013/0036400 A1 | 2/2013 | Bak et al. | |
| 2013/0268920 A1* | 10/2013 | Ursal | G06F 8/70 |
| | | | 717/131 |
| 2014/0278641 A1* | 9/2014 | Kleehammer | G06Q 10/06311 |
| | | | 705/7.15 |
| 2014/0310287 A1* | 10/2014 | Bruso | G06F 17/30336 |
| | | | 707/741 |
| 2016/0020965 A1* | 1/2016 | Sakata | G06F 11/3495 |
| | | | 714/4.12 |

OTHER PUBLICATIONS

European Patent Office, International Searching Authority, International Search Report and Written Opinion dated Apr. 24, 2015 for International Application No. PCT/US2015/012268, 10 pages.

* cited by examiner

SYSTEM AND METHOD FOR MONITORING AND DIAGNOSTICS IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional application titled "SYSTEM AND METHOD FOR MONITORING AND DIAGNOSTICS IN A MULTI-TENANT APPLICATION SERVER ENVIRONMENT", Application No. 62/016,041, filed Jun. 23, 2014; and is related to U.S. patent application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud platform environments, and are particularly related to a system and method for monitoring and diagnostics in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

SUMMARY

In accordance with an embodiment, described herein is a system and method for monitoring and diagnostics in an application server environment. An exemplary system can comprise one or more computers, which can include an application server environment executing thereon, together with a plurality of deployable resources configured to be used within the application server environment, a plurality of resource group templates, wherein each resource group template defines a grouping of deployable resources within a domain, and a plurality of partitions, wherein each partition provides an administrative and runtime subdivision of the domain. A diagnostic framework, such as a WebLogic Diagnostic Framework (WLDF) can also be provided, wherein the diagnostic framework is configured to perform at least one action from the group consisting of partition scoped logging, partition scoped monitoring, and partition scoped diagnostic imaging. The exemplary system can also be configured to associate a partition of the plurality of partitions and a resource group template of the plurality of resource group templates with a tenant, for use by the tenant.

DETAILED DESCRIPTION

In accordance with an embodiment, described herein is a system and method for monitoring and diagnostics in an application server environment. An exemplary system can comprise one or more computers, which can include an application server environment executing thereon, together with a plurality of deployable resources configured to be used within the application server environment, a plurality of resource group templates, wherein each resource group template defines a grouping of deployable resources within a domain, and a plurality of partitions, wherein each partition provides an administrative and runtime subdivision of the domain. A diagnostic framework, such as a WebLogic Diagnostic Framework (WLDF) can also be provided, wherein the diagnostic framework is configured to perform at least one action from the group consisting of partition scoped logging, partition scoped monitoring, and partition scoped diagnostic imaging. The exemplary system can also be configured to associate a partition of the plurality of partitions and a resource group template of the plurality of resource group templates with a tenant, for use by the tenant.

In an embodiment, where the diagnostic framework is configured to perform partition scoped logging, the diagnostic framework can further comprise a log file identifier, wherein the log file identifier is configured to receive, in the context of one of the plurality of partitions, at least one log file. The log file identifier can further be configured to tag the at least one log file with a tag identifier. The diagnostic framework can also include a shared log, wherein the shared log is configured to store the tagged at least one log file, and wherein the shared log is further configured to restrict access to the tagged at least one log file to a partition administrator.

In accordance with an embodiment, where the diagnostic framework is configured to perform partition scoped diagnostic imaging, the diagnostic framework can further comprise a diagnostic image capture module. The diagnostic image capture module can be configured to receiver a diagnostic image capture request, where the diagnostic image capture request requests a scoped diagnostic image of the plurality of partitions. The scoped diagnostic image can be configured to restrict access to diagnostic image data to a partition administrator.

In accordance with an embodiment, where the diagnostic framework is configured to perform partition scoped monitoring, the diagnostic framework can include a plurality of partition monitoring modules, where each partition monitoring module is associated with a partition administrator. In addition, each of the plurality of partition monitoring modules can be configured to monitor a respective one of the plurality of partitions, the respective one of the plurality of partitions being associated with the associated partition administrator.

Application Server (e.g., Multi-Tenant, MT) Environment

Figure 1:
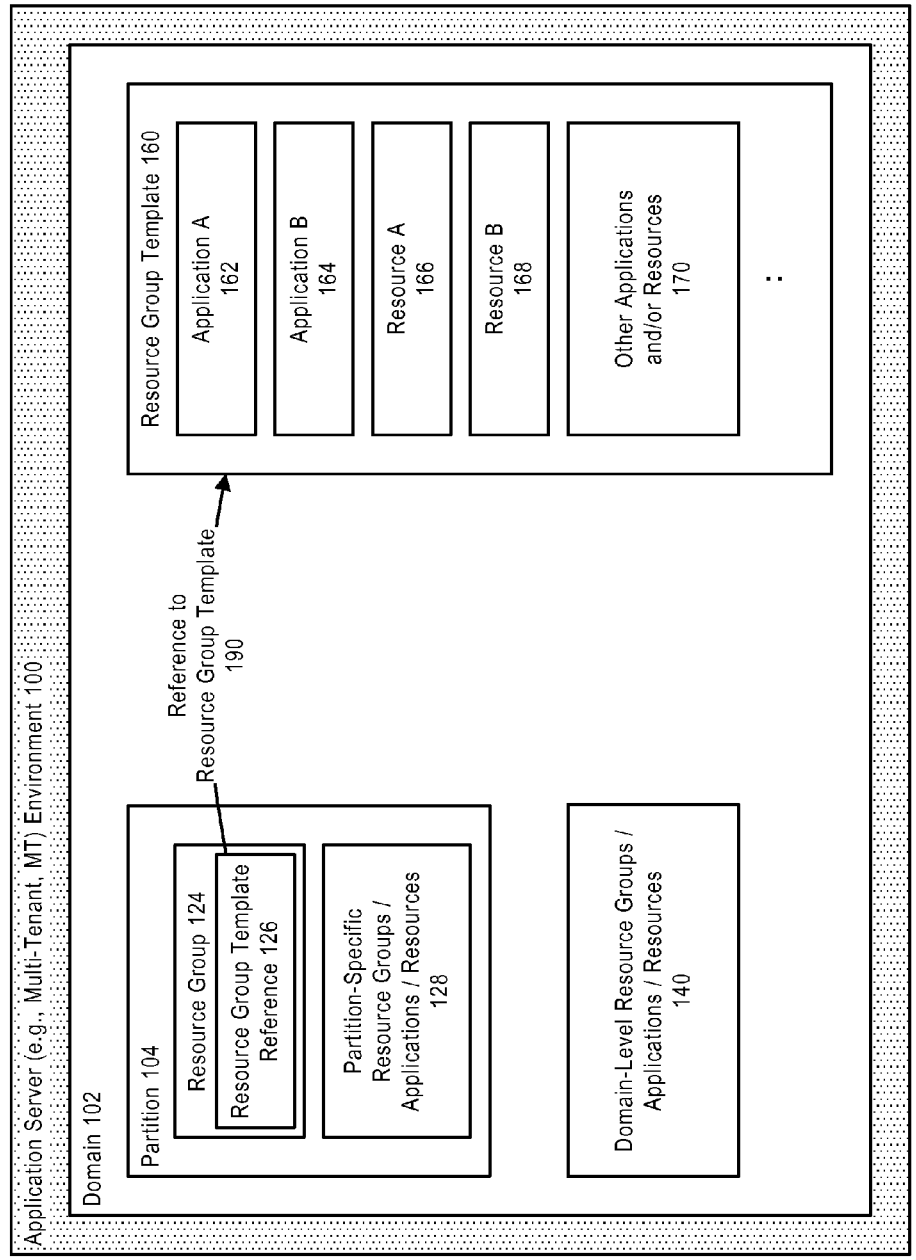
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
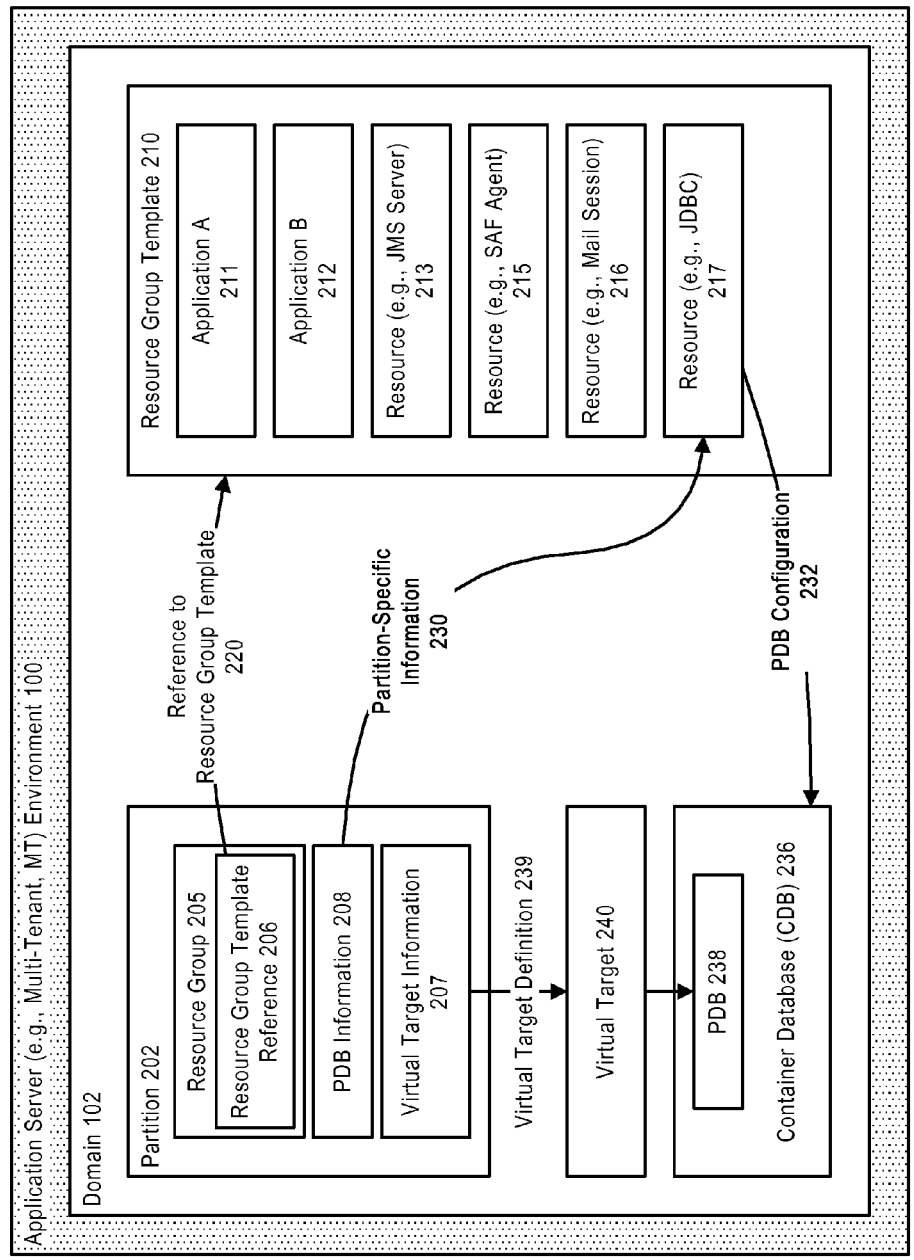
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
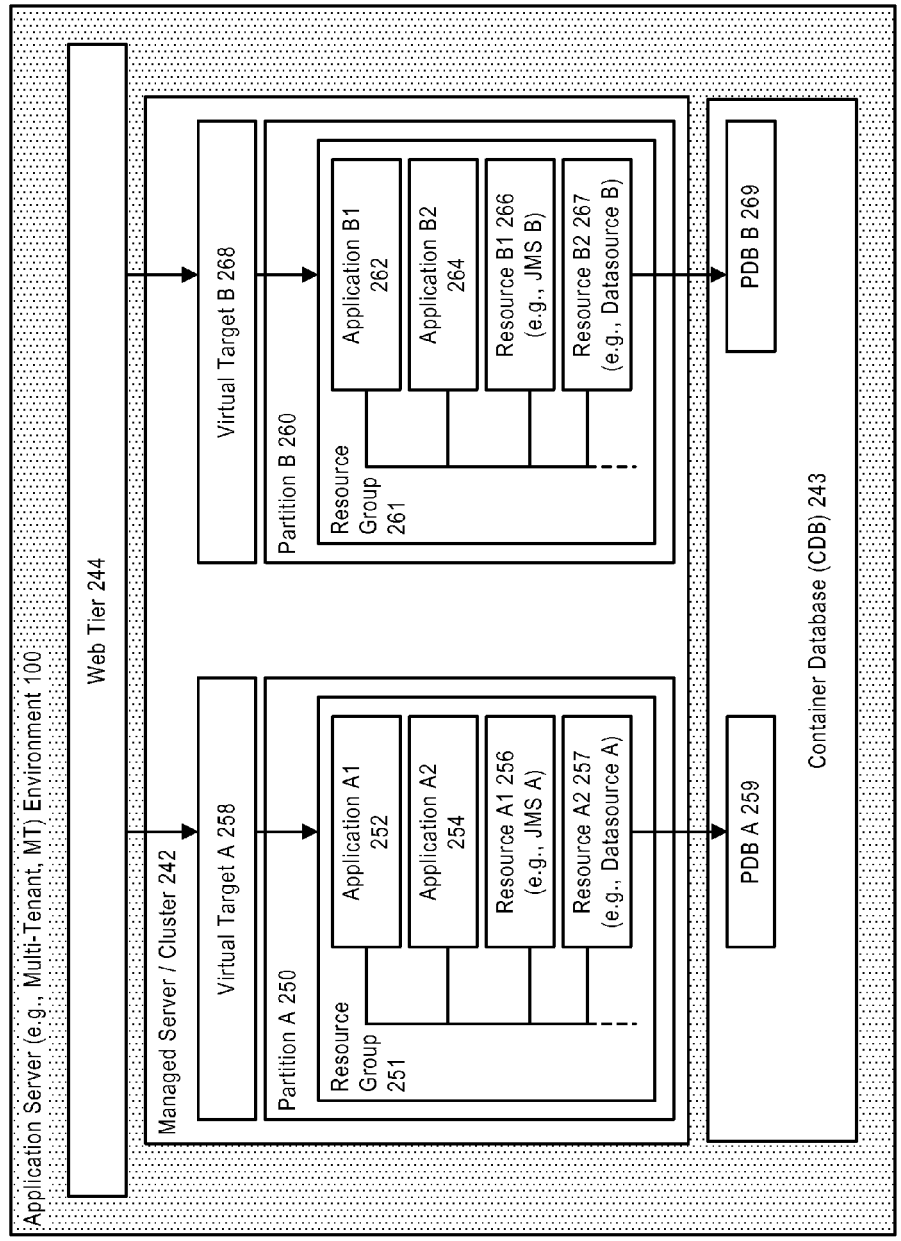
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
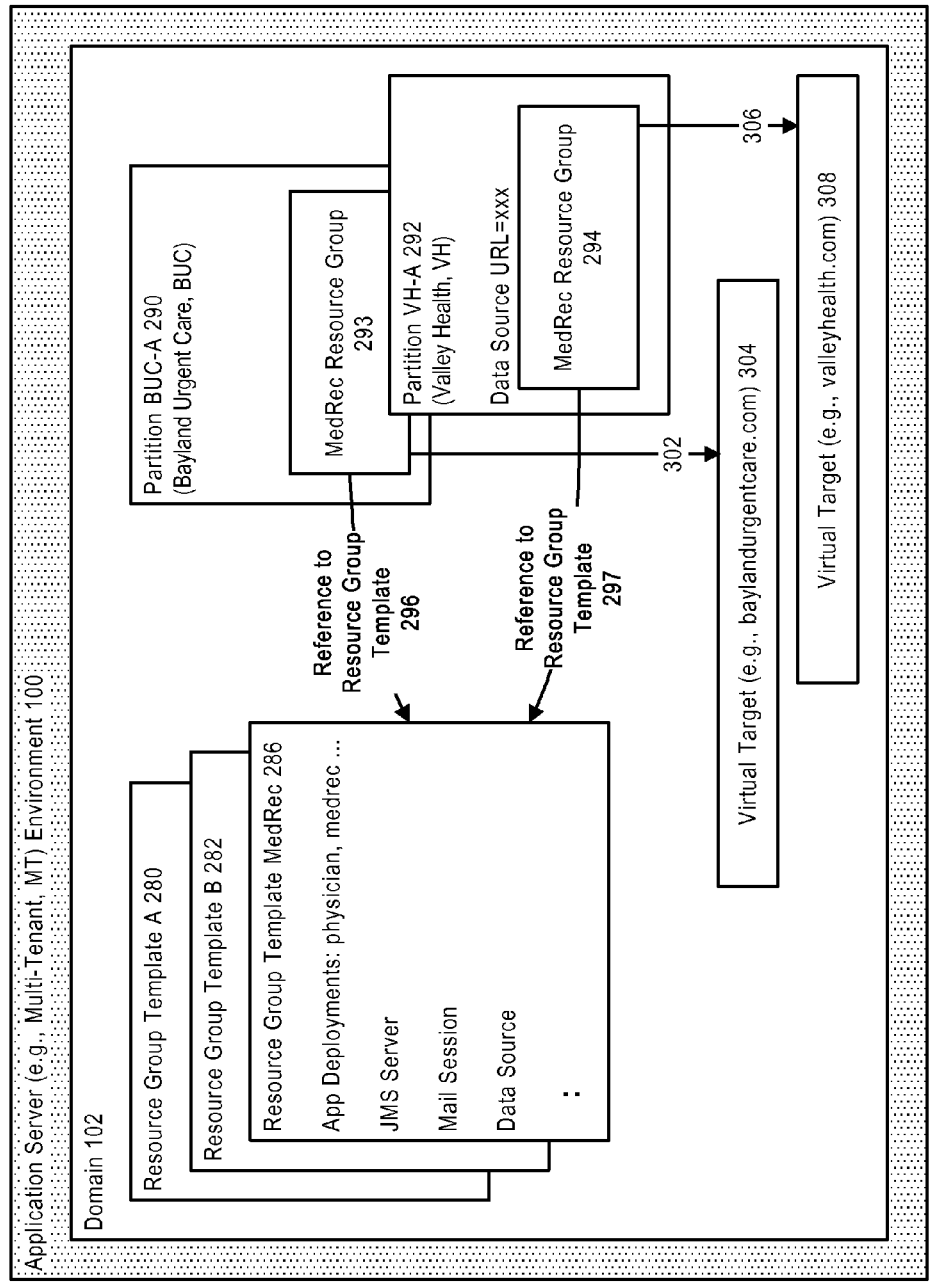
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
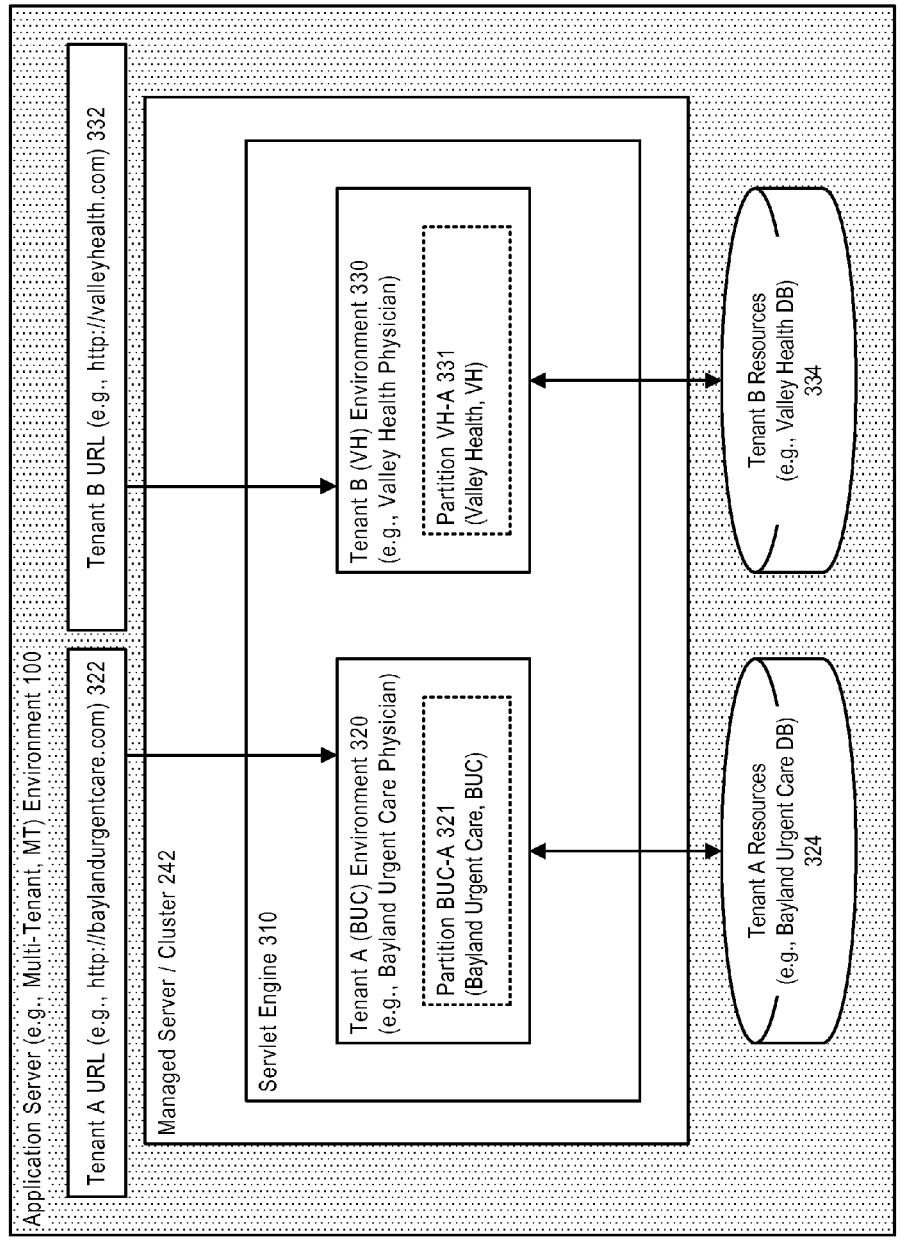
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Monitoring and Diagnostics

In accordance with an embodiment, a system and method can provide greater operational visibility to both system and partition administrators charged with running various systems and partitions within a multi-tenant environment. This greater operational visibility can encompass greater visibility concerning computing resources, as well as the health and state of the various subsystems in order to monitor, diagnose and make informed decisions. However, in making available this information to system and partition administrators, it is also important to secure the information and prevent partition administrators form accessing data to which they are not allowed to access (e.g., information concerning another partition). Further, as partition administrators are generally not allowed access to system wide information (excepting those cases where a partition administrator is also the system administrator), partition scoped information must be presented to a partition administrator so that partition administrators have the ability to monitor their respective partitions.

Scoped Log Data

Figure 6:
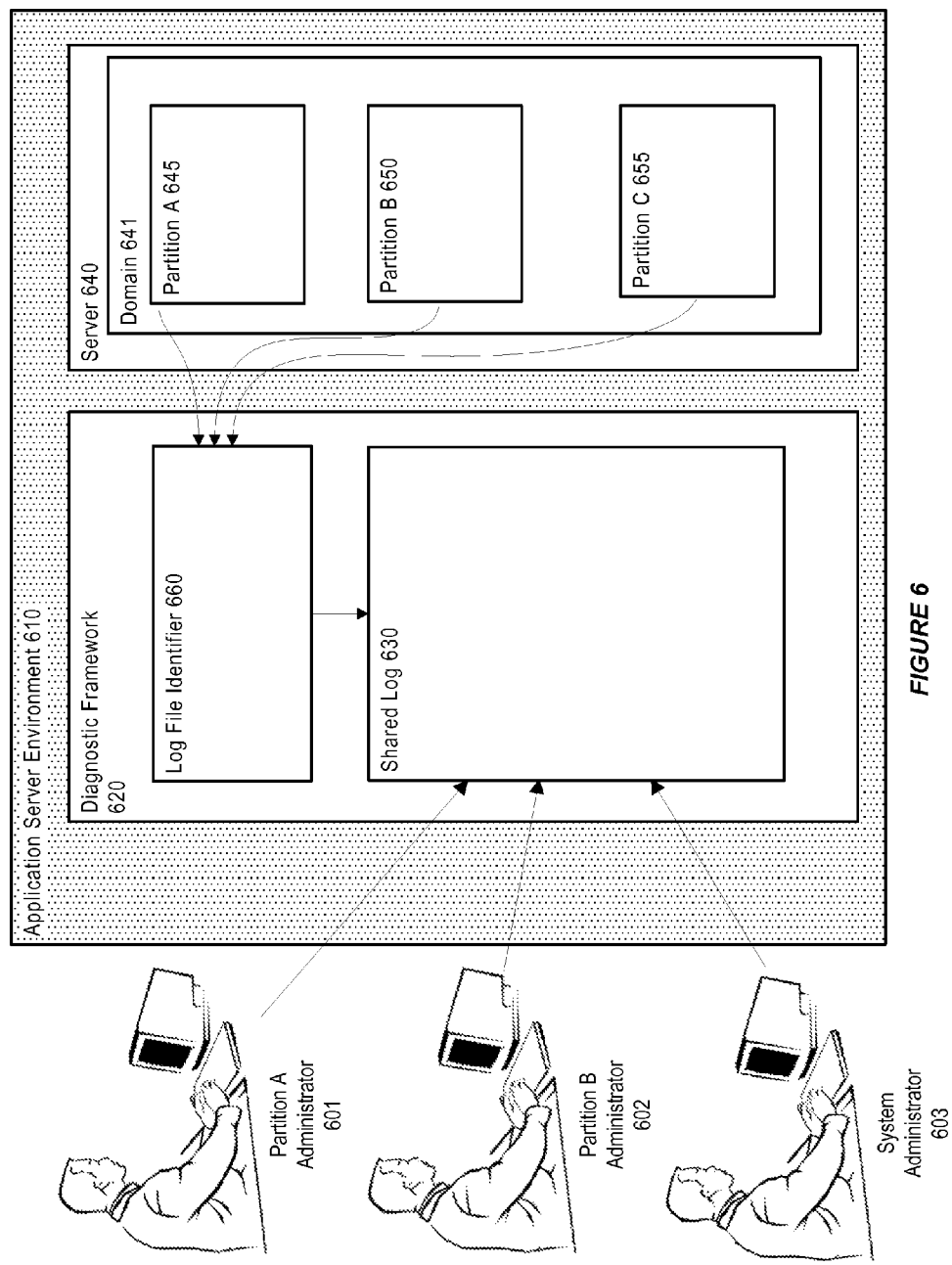
FIG. 6 illustrates monitoring and diagnostics in a multi-tenant application server environment, in accordance with an embodiment.

FIG. 6 illustrates monitoring and diagnostics in a multi-tenant application server environment, in accordance with an embodiment. A application server environment 610 is provided which includes at least one server 640 and a diagnostic framework 620 (e.g. WebLogic Diagnostic Framework (WLDF)). The server includes a domain 641 that includes one or more partitions, for example, partition A 645, partition B 650, and partition C 655. The diagnostic framework 620 includes a log file identifier 660 and a shared log 630. FIG. 6 also illustrates one or more administrators, including partition A administrator 601, partition B administrator 602, and system administrator 603.

In an embodiment, a server can provide server logs, such as server and domain logs, HTTP access logs, JDBC logs, etc. In an application environment, such as that depicted in FIG. 6, these logs can often be generated in the context of a particular partition, such as partition A 645, partition B 650, or partition C 655. From a supportability perspective, it is desirable to keep records of a specific log within a single file, such as shared log 630, as against creating partition specific log files. This allows for easier correlation because they are in a single file while viewing them with a simple text editor. Additionally, it avoids having to keep multiple files open at the same time. By having the log files in a single location, such as shared log 630, this allows multiple administrators, for example partition A administrator 601, partition B administrator 602, and system administrator 603, to access the log files.

In accordance with an embodiment, although system administrator 603 will have access to the entirety of the shared log 630, partition administrators (e.g., partition A administrator 601, and partition B administrator 602) will not have file level access to all log files created from each partition. Instead, partition administrators, such as partition A administrator 601 and partition B administrator 602, can access eligible data through the use of various accessors and interfaces, such as a WLDF accessor or a WebLogic Scripting Tool (WLST) interface. In order do so, an attribute filed can be used as a way of distinguishing various logs that were created in the context of various partitions.

In accordance with an embodiment, a supplemental attribute field is added in the server and domain log records. Such attribute fields can be added to the server and domain log records within the log file identifier 660 before being passed onto the shared log 630. This field can be a list of a name/value pairs enclosed within square brackets [ ]. When a log record is generated in the context of a partition (e.g. partition A 645, partition B 650, or partition C 655), the log file can be tagged with the partitionID and partitionname as supplemental attributes in the form:

[partition-name: partitionA] [partition-id: abcde]

In accordance with an embodiment, in addition to the above name/value pairs enclosed within square brackets [ ], a log file may additional have a severity value added to the log file in order to note the numerical value of a log record's severity in the log file. An example of a complete log record entry in the server log file is shown here:

<Jan 27, 2014 1:00:34 PM EST> <Notice> <WebLogicServer> <slc05wrv> <adminServer> <main> <<WLS Kernel>> < > < > <1390845634494> <[severity-value: 32] [partition-name: partitionA] [partition-id: abcde] > <WL-000365> <Server state changed to RUNNING.>

In accordance with an embodiment, the supplemental attribute fields, such as partitionID and partitionname, can be gathered from a component invocation context (CIC). The component invocation context can be tied to a work request executing within on a thread. This allows for the system to remain unchanged, at least from the components' perspective. The logging system refers to the CIC, which is tied to the thread at any particular instance. If a thread is working on behalf of a partition, then the CIC can be set to the partition on behalf of which the thread is acting. If a particular thread is acting on behalf of any particular partition within the multi-tenant thread, then the CIC can be set likewise to that partition.

In accordance with an embodiment, certain system messages (i.e., certain message-ids) may not be suitable to be accessed by partition administrators even though the message may have been generated in the context of a partition that is associated with the partition administrator attempting to access the message. In such situations a new attribute, such as an exclude_partitionid attribute, can be provided so that such messages are not made available to partition administrators. In certain cases, the default value of such an attribute is false.

In accordance with an embodiment, a partition specific HTTP access log from an associated virtual target will be accessible to partition administrators in their entirely if one exists. While using URI based mapping for partitions, access log records can be logged in the server-wide HTTP access log. The common HTTP access log format is well specified. Therefore, it is not feasible to tag such records with partitionid. Because of this, partition specific URI prefixes can be used as discriminators while providing access to partition administrators In an embodiment, new custom fields ctxpartition_id and ctxpartition_name will be provided to be used with the extended HTTP access log format. The system administrator can determine whether to use the extended log format for HTTP access log and configure these fields to be emitted in log records.

In an embodiment, harvester metrics archive storing sampled metrics values is modeled as a log. In such situations, a field PARTITION can be introduced in the harvester records which can record the partition-id if the metrics were harvested from a partition within a server, such as a partition scoped WLDF system resource. In this manner, eligible data from such log files is selectively accessible to an associated partition administrator.

In an embodiment, events generated by an instrumentation system of a diagnostic framework, such as a WLDF instrumentation system, are stored in the diagnostic framework's even archive, which can be modeled as a log. Generally, server level instrumentation is partition-aware, and thus not accessible to a partition administrator. However, applications contained within a partition may be deployed with instrumentation enabled. In such situations a field can be introduced in the events record which can record the partition-id when events are generated in the context of a partition. In this manner, eligible data from such log files is selectively accessible to an associated partition administrator.

In an embodiment, various server functions, such as Java™ Message Service (JMS) and Store-and-Forward (SAF), logs are generated by server-wide agents, and as such, are not generally accessible to partition administrators. However, logs produced by partition-scoped services, such as JMS and SAF, can be accessible to respective partition administrators in their entirety. Logs produced by JMS and SAF can include a partitionid and/or partition name within the file in order to allow a partition administrator to see such logs within a shared log file.

In an embodiment, servlet context logs from server-wide applications are not generally accessible to partition administrators. However, servlet context logs from partition-scoped applications will be accessible to respective partition administrators. In the absence of explicit configuration, messages logged to the servlet contexts are written to the shared log file. Such records can be tagged with partition-ids and/or partition-names as appropriate, thus making such logs accessible to their respective partition administrators.

In an embodiment, certain information that is generated in the context of a partition is not made available to partition administrators. For example, Java Flight Recorder events generated by a WLDF/JFR integration framework will be tagged with the partition-name and partition-di if generated in the context of a partition. However, because JFR events are captured in a rolling memory buffer, when requested, the buffer is captured in its entirety (e.g., when a diagnostic image is captured). Because of this, JFR events are made to be visible only to system/domain administrators and not partition administrators, despite the JFR events being tagged with, when available, partition identifying information.

In accordance with an embodiment, the application server environment 610 can comprise a multitenant application server (MT) environment.

Selective Access

As described above, in an embodiment, partition administrators, such as partition A administrator 601 and partition B administrator 602, do not have file level access to log files (as opposed to system administrators 603, which generally have full access to the entirety of the shared log 630). However, these partition administrators are able to selectively access log content pertaining to their respective partitions using a, for example, WLDF accessor interface and supported WLDF functions. In order to use these functions, authentication is sometimes required. While accessing the shared log 630 with these interfaces, data is filtered automatically based on the partitions which will be accessible to the partition administrator.

In an embodiment, a partition administrator is able to access data pertaining to his/her partition from WLDF-DataAccessRuntimeMBean's under a PartitionRuntimeMBean for the respective partition.

Partition Scoped Diagnostic Image Capture

Figure 7:
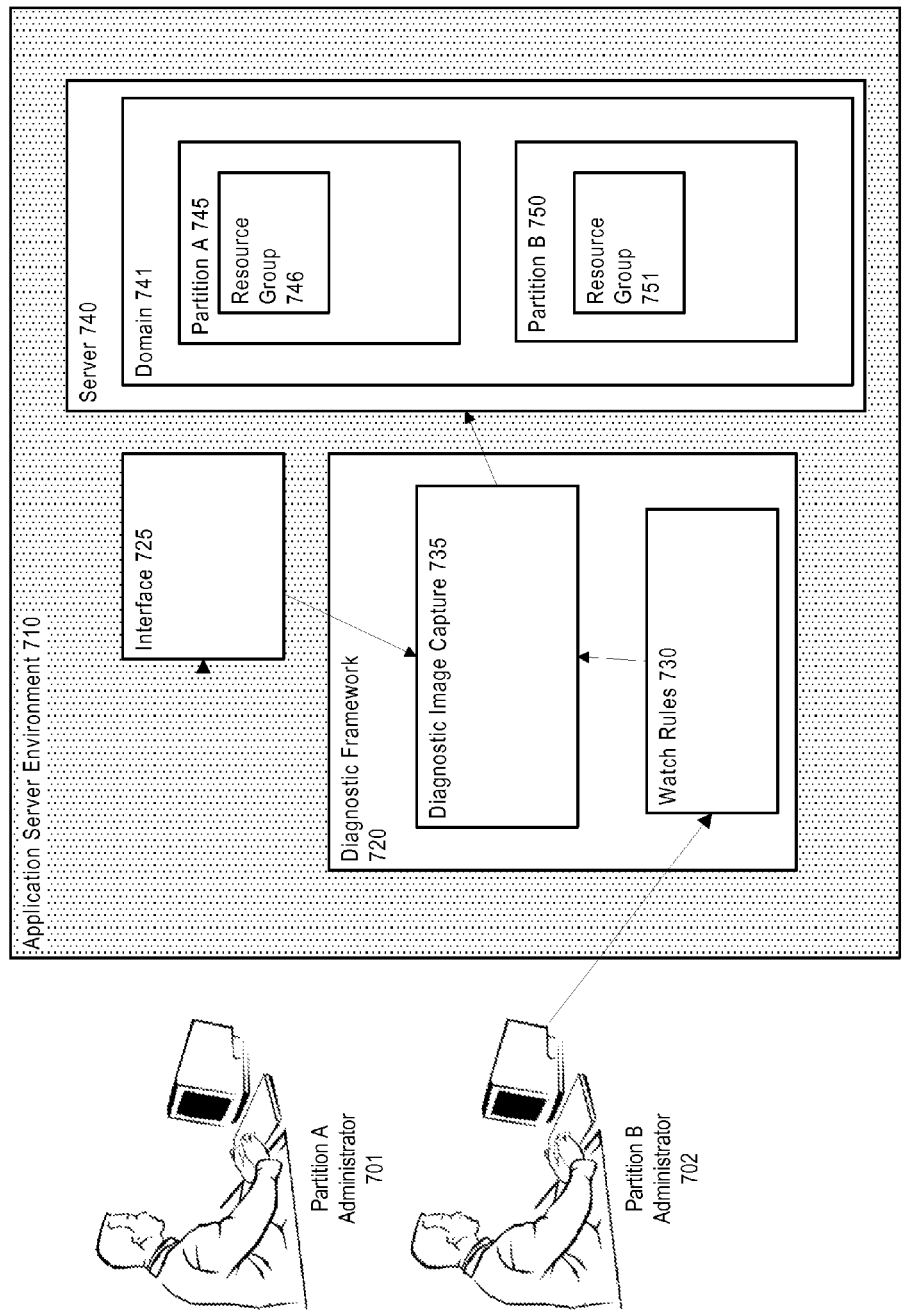
FIG. 7 illustrates monitoring and diagnostics in a multi-tenant application server environment, in accordance with an embodiment.

Referring now to FIG. 7, which illustrates monitoring and diagnostics in an application server environment, in accordance with an embodiment. An application server environment 710 is provided which includes at least one server 740 and a diagnostic framework 720 (e.g. WebLogic Diagnostic Framework (WLDF)). The server includes a domain 741, which includes one or more partitions, for example, partition A 745, and partition B 750. The application server environment 710 additionally includes a interface 725. The diagnostic framework 720 includes a diagnostic image capture module 735 and watch rules 730. FIG. 7 also illustrates one or more administrators, including partition A administrator 701, and partition B administrator 702.

In accordance with an embodiment, the diagnostic framework can include a WebLogic Diagnostic Framework, which can contain a diagnostic image capture module 735. A WLDF diagnostic image contains relevant data from various subsystems of a server, such as a WebLogic server, as it exists when a diagnostic image capture is initiated.

In an embodiment, a diagnostic image capture can be manually initiated by a partition administrator, via, for example, interface 725. This is shown in FIG. 7 where partition A administrator 701 uses interface 725 to initiate a diagnostic image capture within the diagnostic image capture module 735. The interface can include, for example, a console or other dashboard accessible to partition A administrator 701. The interface 725, in another embodiment, can include a WebLogic Scripting Tool (WLST) or a Java Management Extension (JMX) interface.

In an embodiment, the diagnostic image capture can also be automatically initiated via watch rules 730. Watch rules 730, in some embodiments, can be represented by WLDF watch rules, which can be configured by a partition administrator, such as partition B administrator 702, as shown in FIG. 7. These watch rules 730 can be configured by a partition administrator within the diagnostic framework.

In accordance with an embodiment, the contents of the diagnostic image are provided by respective subsystems implementing an interface. The diagnostic image capture mechanism, when called by a partition administrator, via a manual initiation or a rules initiation, can generate a scoped diagnostic image that that contains information restricted to a partition administrator. A diagnostic framework runtime, such as a WLDF runtime, can determine which partition administrator requested the diagnostic image, and in turn can request partition scoped information/data so it receives partition scoped information/data for the scoped diagnostic image. In other words, partition specific content will be included in a generated scoped diagnostic image when a partition administrator calls for a diagnostic image to be captured. For such a partition scoped diagnostic image, a partition-id and partition-name can be encoded into the file name.

Likewise, in an embodiment, when a diagnostic image capture is initiated by invoking an operation on a WLDFImageRuntimeMBean which is under a PartitionRuntimeMBean of a partition, the generated image will contain data pertaining to that partition only. For such a partition scoped diagnostic image, a partition-id and partition-name can be encoded into the file name.

In an embodiment, only partition aware resources, that is, for example, partition-aware resources within resource group 746 or resource group 751, will contribute to the contents of a scoped diagnostic image. This ensures that when a resources within a resource group template are asked to contribute content to a scoped diagnostic image, only those resources that are partition-aware will contribute. This then ensures that a partition administrator cannot access information beyond the scope of their partition. In addition, visibility and access to partition specific images can be limited to the respective partition administrators, as well as any system administrators.

Partition Scoped Monitoring

Figure 8:
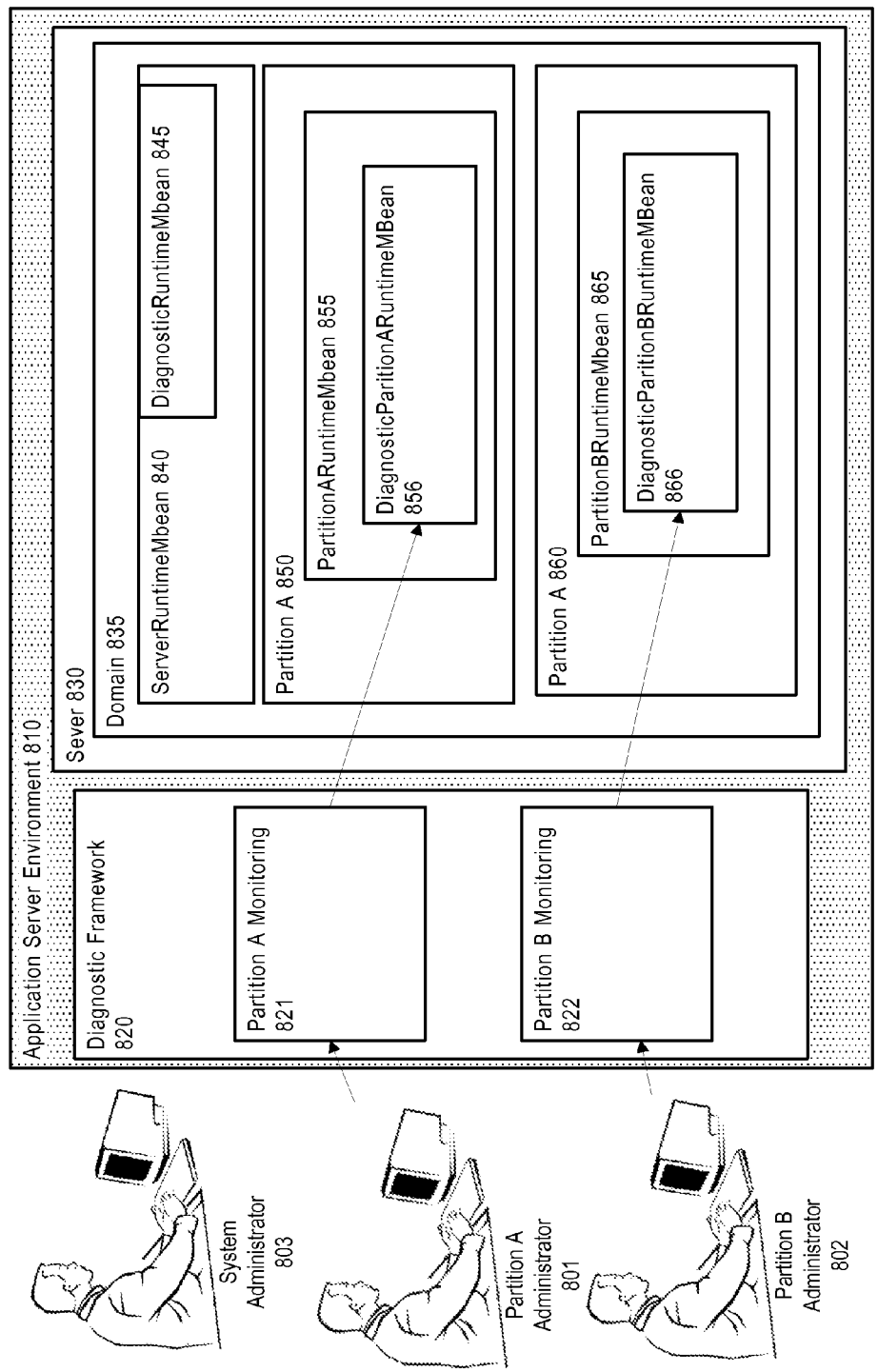
FIG. 8 illustrates monitoring and diagnostics in a multi-tenant application server environment, in accordance with an embodiment.

Referring now to FIG. 8, which illustrates monitoring and diagnostics in an application server environment, in accordance with an embodiment. An application server environment 810 is provided which includes at least one server 830 and a diagnostic framework 820 (e.g. WebLogic Diagnostic Framework (WLDF)). The server includes a domain 835, which includes one or more partitions, for example, partition A 850, and partition B 860. The domain 835 can additionally include serverruntimeMBean 840, which encompasses a diagnosticruntimeMBean 845. Partition A can include partitionAruntimeMBean 855, which can encompass diagnosticpartitionAruntimeMBean 856. Partition B can include partitionBruntimeMBean 865, which can encompass diagnosticpartitionBruntimeMBean 866. The diagnostic framework 820 can include partition A monitoring module 821 and partition B monitoring module 822. FIG. 8 also shows one or more administrators, including partition A administrator 801, and partition B administrator 802, as well as system administrator 803.

In an embodiment, a partition administrator, such as partition administrator A 801, can configure a partition monitoring module, such as partition A monitoring module 821, within the diagnostic framework 820, to monitor his or her partition. The partition A administrator can configure policies and rules, and can define actions to be performed within the partition A monitoring module 821. For example, these policies and rules can specify certain MBean patterns for monitoring within the diagnosticpartitionAruntimeMBean 856. The diagnostic framework 820 can then monitor the appropriate MBeans, as defined by the monitoring modules, pick the appropriate attributes as configured as part of the monitoring module, and then take action when appropriate (such as capturing data based upon the monitored MBeans). However, because a partition administrator is only allowed to see and/or monitor data from within his or her own partition, the diagnostic framework can restrict access to the MBeans and data that the various partition administrators are allowed access to. For example, when monitoring the various diagnostic partition runtime MBeans, the diagnostic framework 820 can allow restricted access to captured runtime data.

In an embodiment, the MBeans that the diagnostic framework 820 monitors, as defined by the various partition monitoring modules, are limited to MBeans within each respective partition. However, in another embodiment, the diagnostic framework 820 can monitor certain MBeans outside of a partition to which partition administrators have been granted access. Such MBeans can, for example, be found within the diagnosticruntimeMBean tree 845.

In accordance with an embodiment, the application server environment 810 can comprise a multitenant application server (MT) environment.

In an embodiment, while a system administrator is able to configure and monitor all MBeans within an application server environment, a partition administrator is able to configured and monitor only those MBeans that represent a subset of runtime MBeans that have been scoped to his or her partition.

In an embodiment, a diagnostic framework, such as WLDF, creates a sub-tree of diagnostic runtime MBeans which are rooted within a WLDFRuntumeMBean instance, which is parented by a ServerRuntimeMBean. This sub-tree can continue to be supported for use (e.g., configuration and monitoring) by a system administrators for managing diagnostics at the server level. A hierarchy of an exemplary WLDF runtime is as follows:

```
ServerRuntimeMBean
    + WLDFRuntimeMBean
        + WLDFAccessRuntimeMBean
            + WLDFDataAccessRuntimeMBean[ ]
        + WLDFArchiveRuntimeMBean[ ]
        + WLDFHarvesterRuntimeMBean
        + WLDFImageRuntimeMBean
        + WLDFInstrumentationRuntimeMBean[ ]
        + WLDFWatchNotificationRuntimeMBean
            + WLDFWatchJMXNotificationRuntimeMBean
            + WLDFWatchNotificationSourceRuntimeMBean
        + WLDFControlRuntimeMBean
        + WLDFSystemResourceControlRuntimeMBean[ ]
```

In an embodiment, a subset of the above runtime MBean tree can be created for each partition within an application server environment, under the respective PartitionRuntimeMBean. Such a sub-tree created under the PartitionRuntimeMBean will be accessible to partition administrators for each respective partition and will allow for those partition administrators to configure and monitor the MBeans. A hierarchy of an exemplary partition runtime is as follows:

```
PartitionRuntimeMBean
    + WLDFPartitionRuntimeMBean
        + WLDFPartitionAccessRuntimeMBean
        + WLDFDataAccessRuntimeMBean[ ]
        + WLDFPartitionImageRuntimeMBean
        + WLDFWatchNotificationRuntimeMBean
            + WLDFWatchJMXNotificationRuntimeMBean
            + WLDFWatchNotificationSourceRuntimeMBean
        + WLDFControlRuntimeMBean
            + WLDFSystemResourceControlRuntimeMBean
```

In an embodiment, partition administrators can access and monitor data pertaining to their partitions from an MBean, such as a WLDFDataAccessRuntimeMBean that is under the PartitionRuntimeMBean for the respective partition. For example, a WLDFAccessRuntimeMBean can allow for a partition administrator to find all available log files. In addition, WLDFDataAccessRuntimeMBean can allow a partition administrator to access and monitor such available logs.

In an embodiment, certain WLDF system resources can be included in the resource group templates associated with different partitions in order to further partition scoped monitoring. However, this is not to be understood to mean that all WLDF system resources will be provided in the scoped resource group templates available to partition administrators. Not all server level instrumentation (e.g. instrumentation that affects the server as a whole) is provided at a partition level. Some examples of WLDF system resources that can be provided at a partition level are metrics harvesting, watch, and notifications.

In an embodiment, a WLDF metrics harvester component is provided within a resource group template that is available to a partition administrator. The WLDF metrics harvester component can periodically sample JMX runtime MBean attributes as per its configuration in the WLDF system resource. The WLDF metrics harvester component, after harvesting the metrics, can store the data in a diagnostics metrics archive. The harvester component can be made available at a partition level.

In an embodiment, the WLDF metrics harvester component, when made available to a partition administrator, follows certain rules. For example, the metrics harvester must be able to access runtime MBeans for resources within the same partition as well as accessible global runtime MBeans. However, the harvested must not be able to access runtime MBeans for resources in other partitions. Additionally, the harvester can be configured in partition-neutral manner, meaning that a particular partition's partition-id or partition-name should not be hard-wired into the configuration. Finally, harvested data, e.g. diagnostic data, should be tagged so that it will be accessible only to a system administrator and the partition administrator form which the metrics were harvested, and no other partition administrators.

In accordance with an embodiment, WLDF watch/notifications component provides functionality to evaluate and configure rules on JMX runtime MBeans metrics, log records, and instrumentation events. The WLDF watch/notifications component, when made available to a partition administrator, follows certain rules. For example, the metrics rules are able to access runtime MBeans for resources within the same partition, as well as accessible global runtime MBeans. However, the metrics rules are not able to access runtime MBeans for resources in other partitions. Log based rules can be evaluated on server and domain log records tagged with an appropriate partition-id or partition-name. It is also allowable to configure rules in a partition-neutral manner, meaning that a partition-id or partition-name should not be hard-wired in the configuration. Partition-scoped JMX notifications should be allowed by adding a JMX notification source as a child of the partition-scoped WLDF runtime MBean hierarchy. These partition-scoped JMX notifications can then send partition scoped JMX notifications to a partition. In addition to metrics and log based rules, rules can also be configured based on instrumentation events generated by execution of instrumented applications within the scope of the partitions. Such events can be tagged with partitionid and/or partition-name. These rules can be configured in a partition neutral manner and the framework can evaluate events based rules on events tagged with a respective partition-id.

In accordance with an embodiment, while invoking operations on behalf of a partition administrator, a partition specific principal can be made available. Partition administrators need the ability to monitor their partitions to the extent possible. Partition scoped monitoring focuses on the following aspects of diagnostics: log data isolation; selective access to diagnostic data; monitoring of resources in partitions; and partition-aware diagnostic image sources.

In accordance with an embodiment, partition scoped monitoring can also include partition specific metrics, such as runtime metrics from partition scoped entities as well as apportioned global metrics.

In an embodiment, for entities created within the scope of a partition, respective subsystems can create appropriate runtime MBeans in order to surface their metrics. Such runtime MBeans can be parented by the PartitionRuntimeMBean (discussed above) instance of the corresponding partition that the entity has been created within. WLDF can treat runtimeMBeans parented by respective PartitionRuntimeMBean instances to be within the scope of that particular partition.

Additionally, in an embodiment, apart from the metrics associated with partition scoped resources, it can be useful to track certain global metrics that pertain to their usage in the context of a partition. Such metrics typically already exist at a global level, but because they exist above the partition level, are generally not accessible by a partition administrator. In order for such global metrics to be visible to a partition administrator (e.g., to assist with monitoring), the metrics are apportioned so that their contribution to a particular partition can be monitored. To that effect, a number of partition specific resource utilization metrics can be maintained and made availed as attributes on a corresponding PartitionRuntimeMBean. Some examples of global apportioned metrics are: allocated Bytes, cpuTime, bytesReceived, bytesSent, requestsReceived, requestsSent, throughput, struckThreadCount, hoggingThreadCount, openDescriptors, retainedMemory, . . . etc.

Enforcement of Partition Scope

In an embodiment, enforcement of partition scope, e.g., restricting access of various partition administrators to information and data scoped to his or her respective partitions is performed via a security configuration. A partition administrator may connect to a diagnostic framework, such as a WebLogic Diagnostic Framework, via a partition-specific URL. Each partition within the multi-tenant application server may also be associated with a different security realm. Once a partition administrator has been authenticated, based at least in part on the partition specific URL as well as the respective security realm, the diagnostic framework, based upon a security configuration, can set the access privileges for any particular partition administrator.

Monitoring and Diagnostics in a Multitenant Application Server Environment

Figure 9:
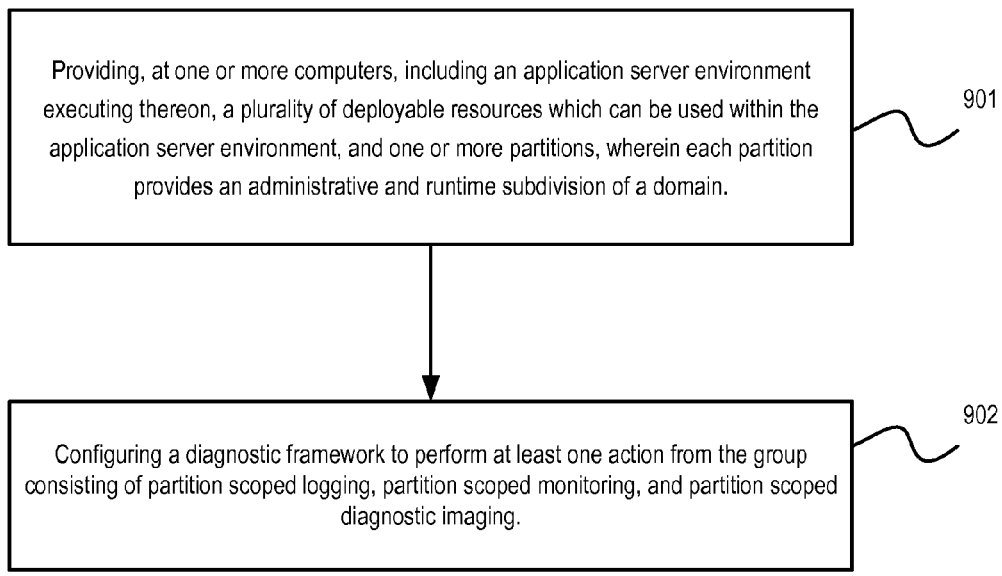
FIG. 9 depicts, as a flow chart, an exemplary method for monitoring and diagnostics in a multi-tenant application server environment.

Referring now to FIG. 9, which depicts, as a flow chart, an exemplary method for monitoring and diagnostics in an application server environment. As shown in FIG. 9, the method may begin at step 901 with providing, at one or more computers, including an application server environment executing thereon, a plurality of deployable resources which can be used within the application server environment, and one or more partitions, wherein each partition provides an administrative and runtime subdivision of the domain. The exemplary method can continue, at step 902, with configuring a diagnostic framework to perform at least one action from the group consisting of partition scoped logging, partition scoped monitoring, and partition scoped diagnostic imaging.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for monitoring and diagnostics in an application server environment, comprising:
   one or more computers, including an application server that enables deployment and execution of software applications, wherein the application server is associated with a domain configuration that is used at runtime to define a domain for execution of the software applications, and a plurality of partitions,
      wherein each of the plurality of partitions are associated with a partition configuration, and wherein each partition provides a subdivision of the domain and includes one or more resource groups; and
   a diagnostic framework, wherein the diagnostic framework is configured to perform partition scoped diagnostic imaging, wherein the diagnostic framework comprises
      a diagnostic image capture module, wherein the diagnostic image capture module is configured to receive a diagnostic image capture request, the diagnostic image capture request requesting a scoped diagnostic image of the plurality of partitions, the scoped diagnostic image being targeted to a partition of the plurality of partitions;
   wherein the scoped diagnostic image is configured to restrict access to diagnostic image data to a partition administrator; and
   wherein access to the scoped diagnostic image is provided to the partition administrator via a partition specific address, the partition specific address being associated with the partition of the plurality of partitions.

2. The system of claim 1, wherein the diagnostic framework is further configured to perform partition scoped logging, and the diagnostic framework further comprises:
   a log file identifier, wherein the log file identifier is configured to receive, in the context of one of the plurality of partitions, at least one log file, wherein the log file identifier is further configured to tag the at least one log file with a tag identifier; and
   a shared log, wherein the shared log is configured to store the tagged at least one log file, and wherein the shared log is further configured to restrict access to the tagged at least one log file to a partition administrator.

3. The system of claim 2, wherein the tag identifier includes a plurality of fields, and wherein the plurality of fields includes a partition-name field and a partition-id field.

4. The system of claim 3, wherein the partition administrator to which access is restricted to is associated with the tag identifier; and
   wherein access to the shared log is provided to the partition administrator via a partition specific address, the partition specific address being associated with the tag identifier.

5. The system of claim 1, wherein the diagnostic framework is further configured to perform partition scoped monitoring, and the diagnostic framework further comprises:
   a plurality of partition monitoring modules, each partition monitoring module being associated with a partition administrator;
   wherein each of the plurality of partition monitoring modules is configured to monitor a respective one of the plurality of partitions, the respective one of the plurality of partitions being associated with the associated partition administrator.

6. The system of claim 5, wherein the each of the plurality of monitoring modules is further configured to capture scoped data from the monitored partition, the scoped data being configured to restrict access to the associated partition administrator.

7. The system of claim 1, wherein the application server environment comprises a multi-tenant application server environment, and wherein the system can associate each of the plurality of partitions with a tenant of a plurality of tenants, for use by the tenant.

8. The system of claim 1, wherein the one or more resource groups comprises one or more partition-aware resources, and one or more partition-unaware resources.

9. A method for monitoring and diagnostics in an application server environment, comprising:
   providing, at one or more computers, including an application server that enables deployment and execution of software applications, a plurality of partitions, wherein the application server is associated with a domain configuration that is used at runtime to define a domain for execution of the software applications,
      wherein each of the plurality of partitions are associated with a partition configuration, and wherein each partition provides a subdivision of the domain and includes one or more resource groups; and
   configuring a diagnostic framework to perform partition scoped diagnostic imaging, the partition scoped diagnostic imaging comprising:
      receiving a diagnostic image capture request at a diagnostic image capture module, the diagnostic image capture request requesting a scoped diagnostic image of the plurality of partitions, the scoped diagnostic image being targeted to a partition of the plurality of partitions; and
      restricting access to diagnostic image data to a partition administrator, the requested scoped diagnostic image comprising the diagnostic image data, wherein access to the diagnostic image is restricted to the partition administrator via a partition specific address, the partition specific address being associated with the partition of the plurality of partitions.

10. The method of claim 9 wherein the diagnostic framework is further configured to perform partition scoped logging, the partition scoped logging comprising:
   receiving, at a log file identifier, in the context of one of the plurality of partitions, at least one log file,
   tagging, at the log file identifier, the at least one log file with a tag identifier;
   storing the tagged at least one log file in a shared log; and
   restricting access to the tagged at least one log file to a partition administrator.

11. The method of claim 10, wherein the tag identifier comprises at least a partition-name field and a partition-id field.

12. The method of claim 11, wherein the partition administrator to which access is restricted to is associated with the tag identifier; and
   wherein access to the shared log is provided to the partition administrator via a partition specific address, the partition specific address being associated with the tag identifier.

13. The method of claim 9, wherein the diagnostic framework is further configured to perform partition scoped monitoring, the partition scoped monitoring comprising:
   associating one of a plurality of partition monitoring modules with a partition administrator; and
   wherein each of the plurality of partition monitoring modules is configured to monitor a respective one of the plurality of partitions, the respective one of the plurality of partitions being associated with the associated partition administrator.

14. The method of claim 13, wherein the each of the plurality of monitoring modules is further configured to capture scoped data from the monitored partition, the scoped data being configured to restrict access to the associated partition administrator.

15. A non-transitory computer readable storage medium, including instructions stored thereon which when read and executed by one or more computers cause the one or more computers to perform the steps comprising:
   providing, at one or more computers, including an application server that enables deployment and execution of software applications, a plurality of partitions, wherein the application server is associated with a domain configuration that is used at runtime to define a domain for execution of the software applications,
      wherein each of the plurality of partitions are associated with a partition configuration, and wherein each partition provides a subdivision of the domain and includes one or more resource groups; and
   configuring a diagnostic framework to perform partition scoped diagnostic imaging, the partition scoped diagnostic imaging comprising:
      receiving a diagnostic image capture request at a diagnostic image capture module, the diagnostic image capture request requesting a scoped diagnostic image of the plurality of partitions, the scoped diagnostic image being targeted to a partition of the plurality of partitions; and
      restricting access to diagnostic image data to a partition administrator, the requested scoped diagnostic image comprising the diagnostic image data, wherein access to the diagnostic image is restricted to the partition administrator via a partition specific address, the partition specific address being associated with the partition of the plurality of partitions.

16. The non-transitory computer readable storage medium of claim 15, wherein the diagnostic framework is further configured to perform partition scoped logging, the partition scoped logging comprising:
   receiving, at a log file identifier, in the context of one of the plurality of partitions, at least one log file,
   tagging, at the log file identifier, the at least one log file with a tag identifier;
   storing the tagged at least one log file in a shared log; and
   restricting access to the tagged at least one log file to a partition administrator.

17. The non-transitory computer readable storage medium of claim 15, wherein the diagnostic framework is further configured to perform partition scoped monitoring, the partition scoped monitoring comprising:
   associating one of a plurality of partition monitoring modules with a partition administrator; and
   wherein each of the plurality of partition monitoring modules is configured to monitor a respective one of the plurality of partitions, the respective one of the plurality of partitions being associated with the associated partition administrator.

* * * * *

UNITED STATES PATENT AND TRADEMARK OFFICE
CERTIFICATE OF CORRECTION

PATENT NO. : 9,959,421 B2  
APPLICATION NO. : 14/747866  
DATED : May 1, 2018  
INVENTOR(S) : Inamdar et al.

Page 1 of 1

It is certified that error appears in the above-identified patent and that said Letters Patent is hereby corrected as shown below:

In the Drawings

Drawing sheet 8 of 9, in FIG. 8, under Reference Numeral 856, Line 1, delete "Parition" and insert -- Partition --, therefor.

Drawing sheet 8 of 9, in FIG. 8, under Reference Numeral 866, Line 1, delete "Parition" and insert -- Partition --, therefor.

In the Specification

Column 10, Line 53, after "administrators" insert -- . --.

Column 12, Line 43, delete "that that" and insert -- that --, therefor.

Signed and Sealed this  
Thirtieth Day of October, 2018

Andrei Iancu  
*Director of the United States Patent and Trademark Office*